Patented May 18, 1937

2,080,561

UNITED STATES PATENT OFFICE 2,080,561

DISPERSION

Benton Dales, Chadds Ford, Pa., and Frederick Baxter Downing, Carneys Point, N. J., assignors to E. I. du Pont de Nemours & Company, Wilmington, Del., a corporation of Delaware No Drawing. Application August 8, 1934, Serial No. 738,929

27 Claims. (Cl. 260—6)

This invention relates to an improved method of preparing dispersions of halogen-2-butadiene-1,3 polymer and to the dispersion obtained by this method. More particularly it relates to an improved method for preparing dispersions of halogen-2-butadiene-1,3 polymer in a liquid which is non-aqueous, or chiefly non-aqueous. Still more particularly it relates to the polymerization of halogen-2-butadiene-1,3 in such media.

The preparation of the halogen-2-butadienes-1,3 which are used in the process of the present invention is described in U. S. Patent No. 1,950,431. The making of aqueous dispersions of halogen-2-butadiene-1,3 polymer is described in a copending application of Collins, Serial No. 537,484, filed May 14, 1931. Acid aqueous dispersions of these substances have been described by Kirby in a copending application, Serial No. 572,739, filed November 2, 1931. The preparation of dispersions of halogen-2-butadiene-1,3 polymer in a medium which is non-aqueous, or chiefly non-aqueous, is described in a copending application of Carothers, Serial No. 738,931, filed Aug. 8, 1934.

It is an object of the present invention to describe an improved method for preparing polymerizable, stable dispersions of halogen-2-butadiene-1,3 in dispersion media which are non-aqueous or chiefly non-aqueous. A further object of the invention is to prepare stable dispersions of halogen-2-butadiene-1,3 polymer which have greater average particle size and more variable particle size than the dispersions previously known to the art. A still further object is the formation of halogen-2-butadiene-1,3 polymer masses, having different physical properties from the masses previously described in the art. Other objects will appear hereinafter.

In the dispersions described in the prior art the halogen-2-butadiene-1,3 polymerizes spontaneously and the 3-4-micron particles of the monomer break into very much smaller particles of polymer. These smaller polymer particles are of the order of .1 micron diameter. By the process of this invention dispersions containing a higher percentage of the polymer in the form of particles of the diameter of 2 to 4 microns are obtained, the size of the particles grading down to 0.1 microns.

It has now been found that the objects of this invention may be accomplished by partially polymerizing the halogen-2-butadiene-1,3 and then dispersing it in a medium which is non-aqueous, or chiefly non-aqueous, in which medium the halogen-2-butadiene-1,3 is insoluble and which medium does not prevent the polymerization of the halogen-2-butadiene-1,3.

The following examples are intended to be construed as illustrative only and not as limiting the scope of the invention.

Example 1

200 parts of chloro-2-butadiene-1,3 (85-75% monomer, 15-25% polymer) are emulsified in a solution of 4 parts of sodium oleate in 36 parts of water and 160 parts of glycerin. Further polymerization is allowed to take place under careful temperature control, the rate corresponding to the rate of polymerization in aqueous dispersions.

Example 2

200 parts of chloro-2-butadiene-1,3 (85-75% monomer, 15-25% polymer) are emulsified in a solution of 4 parts of sodium oleate in 36 parts of water and 160 parts of ethylene glycol. Further polymerization is allowed to take place under careful temperature control, the rate being about the same as that previously described for aqueous dispersions.

Example 3

200 parts of chloro-2-butadiene-1,3 (85-75% monomer, 15-25% polymer) are emulsified in a solution of 4 parts of sodium oleate in 200 parts of glycerin, prepared by heating and then allowing the solution to cool before use. Further polymerization, as in Example 1, is allowed to take place.

Example 4

200 parts of chloro-2-butadiene-1,3 (85-75% monomer, 15-25% polymer) are emulsified in a solution of 4 parts of sodium salts of sulfate esters (described below) in 200 parts of formamide. Further polymerization, as in Example 1, is allowed to take place.

The sodium salts used in this example were prepared by treating a mixture of alcohols, principally, oleyl, but containing some cetyl and some stearyl, with acetic anhydride and then with fuming sulfuric acid after which the acid esters so formed were neutralized with soda ash.

The usual stabilizing agents may be added. By way of illustration to the product of the above examples, 3 parts of 29% ammonium hydroxide and 5 parts of a 50% dispersion of ethyl or phenyl-beta-naphthylamine may be added.

In general, in the preparation of dispersions of the type described herein, the halogen-2-butadiene-1,3 is allowed to polymerize until it contains from 15 to 25% polymer. These limits are not absolute, however, and some variation is permissible. The halogen-2-butadiene-1,3 is allowed to polymerize in bulk with or without the addition of polymerization retarders until it has reached the desired stage of polymerization.

As the dispersion medium any non-aqueous, or chiefly non-aqueous, liquid may be used provided the halogen-2-butadiene-1,3 is insoluble in the liquid, and provided that the liquid does not prevent the polymerization of the halogen-2-butadiene-1,3. It is to be understood that media which merely retard the polymerization but do not prevent it are to be included within the scope of this invention. A number of illustrations of such dispersion media are given in the above examples.

As emulsifying agents in general, any of those which are well known may be used, as for example, sodium or potassium soaps, alkali metal salts of alkyl naphthalene sulfonic acids or the improved dispersing agents recently described which consist of the alkali metal salts of the sulfuric acid esters of the normal straight-chain primary aliphatic alcohols containing more than 8 carbon atoms. In certain cases it may be desirable to add just sufficient water to assist in the solution of the emulsifying agent.

The amount of emulsifying agent to be used is susceptible to rather wide variation. Amounts ranging from 1% to 3%, based on the halogen-2-butadiene-1,3 have given good results. Greater amounts may be used but they are ordinarily unnecessary. 2% on the same basis is the amount usually employed.

The dispersed halogen-2-butadiene-1,3 polymerizes just as it does in the aqueous dispersions previously described, and heat, pressure, the presence of catalysts, inhibitors, alkalies, oxygen and oxidizing agents have effects similar to those in aqueous dispersions. The proportion of halogen-2-butadiene-1,3 which may be dispersed in these media may be as great as 60%, while variations above this amount and considerable variation below it are, however, possible. So long as the proportion of halogen-2-butadiene-1,3 does not substantially exceed 60% the dispersions are stable enough to complete the polymerization of the dispersed halogen-2-butadiene-1,3 without coagulation.

As is apparent from the general description, this invention may be applied to the halogen-2-butadienes-1,3 in general. The preferred latices are, however, prepared from chloro-2-butadiene-1,3. Very good ones have also been obtained from bromo-2-butadiene-1,3.

The halogen-2-butadiene-1,3 may be coagulated from the latices by acids or by alcohol or it may be separated by filtration through porous porcelain. The organic liquid may be removed from the coagulum by washing on the rolls of a rubber washing mill with water or with alcohol. Any material which may be dispersed in the same non-aqueous liquid as the halogen-2-butadiene-1,3 to give dispersed particles bearing a negative charge may be added to the latices of this invention.

Thus by the process of this invention a wide variety of latices may be obtained. As indicated above, in these latices the dispersed particles of polymer are of much larger average size than those in the halogen-2-butadiene-1,3 polymer latices, previously described. This is particularly advantageous, since it gives a halogen-2-butadiene-1,3 polymer latex having particles of a size more nearly comparable to that of rubber. This makes it possible to compare these latices with rubber latex on a more sound basis.

It is apparent that many widely different embodiments of this invention may be made without departing from the spirit and scope thereof, therefore, it is not to be limited except as indicated in the appended claims.

We claim:

1. A dispersion comprising a halogen-2-butadiene-1,3 polymer polymerized after dispersion in an organic liquid which is a non-solvent for the halogen-2-butadiene-1,3 and is not capable of preventing the polymerization of the halogen-2-butadiene-1,3 and further characterized in that a higher percentage of the particles of the halogen-2-butadiene-1,3 polymer have a diameter in excess of 2 microns, the proportion of particles having this diameter being determined by the degree of polymerization prior to dispersion, the degree being from about 15% to about 25% polymerization.

2. A dispersion comprising chloro-2-butadiene-1,3 polymer polymerized after dispersion in an organic liquid which is a non-solvent for the chloro-2-butadiene-1,3 and is not capable of preventing the polymerization of the chloro-2-butadiene-1,3 and further characterized in that a higher percentage of the particles of the chloro-2-butadiene-1,3 polymer have a diameter in excess of 2 microns, the proportion of particles having this diameter being determined by the degree of polymerization prior to dispersion, the degree being from about 15% to about 25% polymerization.

3. The dispersion claimed in claim 2 further characterized in that it contains an emulsifying agent and an amount of water not substantially exceeding that amount required to dissolve the emulsifying agent present.

4. A dispersion comprising a halogen-2-butadiene-1,3 polymer polymerized after dispersion in a liquid of the class consisting of glycerin, ethylene glycol and formamide, a higher percentage of the particles of said polymer having a diameter in excess of 2 microns, the proportion of particles having this diameter being determined by the degree of polymerization prior to dispersion, the degree being from about 15% to about 25% polymerization.

5. A dispersion comprising chloro-2-butadiene-1,3 polymer polymerized after dispersion in a liquid of the class consisting of glycerin, ethylene glycol and formamide, a higher percentage of the particles of said polymer having a diameter in excess of 2 microns, the proportion of particles having this diameter being determined by the degree of polymerization prior to dispersion, the degree being from about 15% to about 25% polymerization.

6. A dispersion comprising chloro-2-butadiene-1,3 polymer polymerized after dispersion in glycerin in the presence of an emulsifying agent, a higher percentage of the particles of the chloro-2-butadiene-1,3 polymer having a diameter in excess of 2 microns, the proportion of particles having this diameter being determined by the degree of polymerization prior to dispersion, the degree being from about 15% to about 25% polymerization.

7. The process which comprises partially polymerizing a halogen-2-butadiene-1,3 until it contains from about 15% to about 25% polymer, then forming a dispersion of the partially polymerized halogen-2-butadiene-1,3 in an organic liquid as the continuous phase, which organic liquid is a non-solvent for the halogen-2-butadiene-1,3 and is not capable of preventing the polymerization of the halogen-2-butadiene-1,3.

8. The process which comprises partially polymerizing a halogen-2-butadiene-1,3 until it contains from about 15% to about 25% polymer, then forming a dispersion of the partially polymerized halogen-2-butadiene-1,3 in an organic liquid as the continuous phase, which organic liquid is a liquid of the group consisting of glycerin, ethylene glycol, and formamide the polymerization of the halogen-2-butadiene-1,3 and then polymerizing the dispersed halogen-2-butadiene-1,3.

9. The process which comprises partially polymerizing chloro-2-butadiene-1,3 until it contains from about 15% to about 25% polymer, then forming a dispersion of the partially polymerized chloro-2-butadiene-1,3 in an organic liquid as the continuous phase, which organic liquid is a non-solvent for the chloro-2-butadiene-1,3 and is not capable of preventing the polymerization of the chloro-2-butadiene-1,3 and which liquid contains an emulsifying agent and then further polymerizing the dispersed chloro-2-butadiene-1,3.

10. The process which comprises partially polymerizing chloro-2-butadiene-1,3 until it contains from about 15% to about 25% polymer, then forming a dispersion of the partially polymerized chloro-2-butadiene-1,3 in an organic liquid as the continuous phase, which organic liquid is a liquid of the group consisting of glycerin, ethylene glycol and formamide, said liquid containing an emulsifying agent and then further polymerizing the dispersed chloro-2-butadiene-1,3.

11. The process which comprises dispersing chloro-2-butadiene-1,3 containing from about 15% to about 25% polymer in glycerin in the presence of an emulsifying agent and then further polymerizing the dispersed chloro-2-butadiene-1,3.

12. A dispersion comprising chloro-2-butadiene-1,3 polymer polymerized after dispersion in ethylene glycol in the presence of an emulsifying agent, a higher percentage of the particles of the chloro-2-butadiene-1,3 polymer having a diameter in excess of 2 microns, the proportion of particles having this diameter being determined by the degree of polymerization prior to dispersion, the degree being from about 15% to about 25% polymerization.

13. A dispersion comprising chloro-2-butadiene-1,3 polymer polymerized after dispersion in formamide in the presence of an emulsifying agent, a higher percentage of the particles of the chloro-2-butadiene-1,3 polymer having a diameter in excess of 2 microns, the proportion of particles having this diameter being determined by the degree of polymerization prior to dispersion, the degree being from about 15% to about 25% polymerization.

14. A dispersion as described in claim 2 characterized in that it contains 40 to 60% of chloro-2-butadiene-1,3 polymer.

15. A dispersion as described in claim 5 characterized in that it contains 40 to 60% of chloro-2-butadiene-1,3 polymer.

16. The process of claim 10 characterized in that after polymerization the dispersion is made alkaline with ammonium hydroxide solution and an antioxidant is added.

17. The process which comprises polymerizing chloro-2-butadiene-1,3 until it contains about 15% to about 25% polymer, then dispersing from 40 to 60%, based on the weight of the resulting dispersion, of the partially polymerized chloro-2-butadiene-1,3 in glycerin, in the presence of 1 to 3%, based on the chlorobutadiene, of sodium oleate in water solution and thereafter continuing the polymerization of the dispersed chlorobutadiene under careful temperature control.

18. The process which comprises polymerizing chloro-2-butadiene-1,3 until it contains about 15% to about 25% polymer, then dispersing from 40 to 60%, based on the weight of the resulting dispersion, of the partially polymerized chloro-2-butadiene-1,3 in ethylene glycol, in the presence of 1 to 3%, based on the chlorobutadiene, of sodium oleate in water solution and thereafter continuing the polymerization of the dispersed chlorobutadiene under careful temperature control.

19. The process which comprises polymerizing chloro-2-butadiene-1,3 until it contains about 15% to about 25% polymer, then dispersing from 40 to 60%, based on the weight of the resulting dispersion, of the partially polymerized chloro-2-butadiene-1,3 in glycerin, in the presence of 1 to 3%, based on the chlorobutadiene, of sodium salts of the sulfate esters of normal primary alcohols, containing from 12 to 18 carbon atoms and thereafter continuing the polymerization of the dispersed chlorobutadiene under careful temperature control.

20. The process which comprises dispersing about 200 parts of chloro-2-butadiene-1,3 containing from 15 to 25% of polymer in a solution of about 4 parts of sodium oleate in about 36 parts of water and about 160 parts of glycerin, and then further polymerizing the dispersed chloro-2-butadiene-1,3 under careful temperature control.

21. The process which comprises dispersing about 200 parts of chloro-2-butadiene-1,3 containing from 15 to 25% of polymer in a solution of about 4 parts of sodium oleate in about 200 parts of glycerin, and then further polymerizing the dispersed choloro-2-butadiene-1,3 under careful temperature control.

22. The process which comprises dispersing about 200 parts of chloro-2-butadiene-1,3 containing from 15 to 25% of polymer in a solution in about 200 parts of formamide of about 4 parts of a mixture of the sodium salts of the sulfate esters of a mixture of alcohols, principally, oleyl and also containing some cetyl and some stearyl alcohols, said sodium salts being those obtainable by treating the mixture of alcohols with acetic anhydride, then with fuming sulfuric acid, and then with soda ash, and then further polymerizing the dispersed chloro-2-butadiene-1,3 under careful temperature control.

23. The dispersion described in claim 5 further characterized in that it contains an emulsifying agent.

24. The process of claim 7 further characterized in that the halogen-2-butadiene-1,3 is chloro-2-butadiene 1,3 and in that the organic liquid is a liquid of the group consisting of glycerin, ethylene glycol, and formamide.

25. The process which comprises partially polymerizing a halogen-2-butadiene-1,3 until it contains from about 15% to about 25% polymer, then forming a dispersion of the partially polymerized halogen-2-butadiene-1,3 in an organic liquid as the continuous phase, which organic liquid is a non-solvent for the halogen-2-butadiene-1,3 and is not capable of preventing the polymerization of the halogen-2-butadiene-1,3, and then further polymerizing the dispersed halogen-2-butadiene-1,3.

26. The process of claim 10 further characterized in that an amount of water not substantially exceeding that amount required to dissolve the emulsifying agent present has been added to the liquid prior to the dispersion of the chloro-2-butadiene-1,3.

27. The pocess of claim 8 futher characterized in that an emulsifying agent has been added to the liquid prior to the dispersion of the halogen-2-butadiene-1,3.

FREDERICK BAXTER DOWNING.
BENTON DALES.

CERTIFICATE OF CORRECTION.

Patent No. 2,080,561.

May 18, 1937.

BENTON DALES, ET AL.

It is hereby certified that error appears in the printed specification of the above numbered patent requiring correction as follows: Page 3, first column, lines 12 and 13, claim 8, strike out the words "the polymerization of the halogen-2-butadiene-1,3; and that the said Letters Patent should be read with this correction therein that the same may conform to the record of the case in the Patent Office.

Signed and sealed this 5th day of October, A. D. 1937.

Henry Van Arsdale (Seal)

Acting Commisioner of Patents.

ther polymerizing the dispersed halogen-2-butadiene-1,3.

26. The process of claim 10 further characterized in that an amount of water not substantially exceeding that amount required to dissolve the emulsifying agent present has been added to the liquid prior to the dispersion of the chloro-2-butadiene-1,3.

27. The pocess of claim 8 futher characterized in that an emulsifying agent has been added to the liquid prior to the dispersion of the halogen-2-butadiene-1,3.

FREDERICK BAXTER DOWNING.
BENTON DALES.

CERTIFICATE OF CORRECTION.

Patent No. 2,080,561.     May 18, 1937.

BENTON DALES, ET AL.

It is hereby certified that error appears in the printed specification of the above numbered patent requiring correction as follows: Page 3, first column, lines 12 and 13, claim 8, strike out the words "the polymerization of the halogen-2-butadiene-1,3; and that the said Letters Patent should be read with this correction therein that the same may conform to the record of the case in the Patent Office.

Signed and sealed this 5th day of October, A. D. 1937.

Henry Van Arsdale (Seal)
Acting Commisioner of Patents.

CERTIFICATE OF CORRECTION.

Patent No. 2,080,561. May 18, 1937.

BENTON DALES, ET AL.

It is hereby certified that error appears in the printed specification of the above numbered patent requiring correction as follows: Page 3, first column, lines 12 and 13, claim 8, strike out the words "the polymerzation of the halogen-2-butadiene-1,3; and that the said Letters Patent should be read with this correction therein that the same may conform to the record of the case in the Patent Office.

Signed and sealed this 5th day of October, A. D. 1937.

Henry Van Arsdale (Seal) Acting Commissioner of Patents.